(12) United States Patent
Kay (10) Patent No.: US 8,082,064 B2
(45) Date of Patent: Dec. 20, 2011

(54) ROBOTIC ARM AND CONTROL SYSTEM

(75) Inventor: Robert L. Kay, Thousand Oaks, CA (US)

(73) Assignee: Elite Engineering Corporation, Thousand Oaks, CA (US)

( * ) Notice: Subject to any disclaimer, the term of this patent is extended or adjusted under 35 U.S.C. 154(b) by 1015 days.

(21) Appl. No.: 11/985,176

(22) Filed: Nov. 13, 2007

(65) Prior Publication Data

US 2009/0055024 A1 Feb. 26, 2009

Related U.S. Application Data

(60) Provisional application No. 60/966,137, filed on Aug. 24, 2007.

(51) Int. Cl.
*G05B 15/00* (2006.01)

(52) U.S. Cl. ........ 700/259; 700/214; 700/218; 700/248; 700/249; 700/254; 318/568.11; 318/568.16; 318/577; 901/1; 901/2; 901/9; 901/46; 901/47; 250/208.1; 250/559.33; 600/12; 600/407; 600/427; 600/429; 600/434; 606/130

(58) Field of Classification Search .................. 700/214, 700/218, 248, 249, 254, 258, 259, 264; 318/568.11, 318/568.16, 577; 901/1, 2, 9, 46, 47; 600/12, 600/407, 427, 429, 434; 250/208.1, 559.33; 604/891.04; 606/130; 382/294; 378/117
See application file for complete search history.

(56) References Cited

U.S. PATENT DOCUMENTS

| | | | |
|---|---|---|---|
| 4,146,924 A | 3/1979 | Birk et al. ................... 364/513 |
| 4,575,304 A | 3/1986 | Nakagawa et al. ........... 414/730 |
| 4,611,292 A | 9/1986 | Ninomiya et al. ............ 364/559 |
| 4,613,942 A | 9/1986 | Chen ............................. 364/513 |
| 4,636,137 A | 1/1987 | Lemelson ..................... 414/730 |

(Continued)

FOREIGN PATENT DOCUMENTS

WO WO 2006114216 A1 11/2006

OTHER PUBLICATIONS

PCT Notification of the International Search Report and the Written Opinion of the International Searching Authority, Dated Apr. 28, 2009; For International Application No. PCT/US2008/004145.

*Primary Examiner* — James Trammell
*Assistant Examiner* — McDieunel Marc
(74) *Attorney, Agent, or Firm* — Koppel, Patrick, Heybl & Philpott (57) ABSTRACT

A robotic arm and control system includes a robotic arm which moves in response to one or more command signals. One or more "active" fiducials are located on the arm, each of which emits its own light. A 3D camera having an associated field-of-view is positioned such that at least one fiducial and a target object to be manipulated are in the FOV. To determine their spatial positions, the arm fiducials are activated and the target object is preferably illuminated with a scanning laser; the camera produces output signals which vary with the spatial locations of the fiducials and target object. A controller receives the output signals and uses the spatial position information as feedback to continuously guide the arm towards the target object. Multiple active fiducials may be employed, each having respective characteristics with which they can be differentiated.

27 Claims, 4 Drawing Sheets

U.S. PATENT DOCUMENTS

| | | | |
|---|---|---|---|
| 4,853,771 A | 8/1989 | Witriol et al. | 358/93 |
| 5,219,264 A * | 6/1993 | McClure et al. | 414/730 |
| 5,243,266 A * | 9/1993 | Kasagami et al. | 318/568.1 |
| 5,321,353 A | 6/1994 | Furness | 318/568.11 |
| 5,331,413 A * | 7/1994 | Diner | 348/159 |
| 5,506,682 A | 4/1996 | Pryor | 356/375 |
| 5,579,444 A | 11/1996 | Dalziel et al. | 395/94 |
| 5,802,201 A | 9/1998 | Nayar et al. | 382/153 |
| 5,983,166 A | 11/1999 | Matsumoto et al. | 702/152 |
| 6,194,860 B1 | 2/2001 | Seelinger et al. | 318/587 |
| 6,675,070 B2 | 1/2004 | Lapham | 700/245 |
| 6,681,151 B1 | 1/2004 | Weinzimmer et al. | 700/259 |
| 6,816,755 B2 | 11/2004 | Habibi et al. | 700/259 |
| 2004/0146203 A1* | 7/2004 | Yoshimura et al. | 382/218 |
| 2007/0189925 A1* | 8/2007 | Blecka et al. | 422/64 |
| 2008/0071290 A1* | 3/2008 | Larkin et al. | 606/130 |

* cited by examiner

ROBOTIC ARM AND CONTROL SYSTEM

RELATED APPLICATIONS

This application claims the benefit of provisional patent application No. 60/966,137 to Robert L. Kay, filed Aug. 24, 2007.

BACKGROUND OF THE INVENTION

1. Field of the Invention

This invention relates generally to robotics, and more particularly to robotic arms and systems for controlling such arms.

2. Description of the Related Art

Robotic arms—i.e., articulated mechanisms designed to perform one or more tasks, typically under the control of a computer—are commonly used in factory and assembly line environments. For example, one common task performed by a robotic arm is to grip a target object and then move it to a desired location. This is accomplished with the help of an 'effector' mechanism, typically located on the end of a robotic arm; a typical effector is a "gripper" which has at least one movable jaw that is closed in order to grip or grasp a target object.

Traditionally, angle sensors such as encoders are incorporated into a robotic arm's joints, and are used to determine the position of the arm. By knowing the exact length of each portion of the arm, and the size and angle of each joint, a computer can calculate the spatial position of the arm.

However, there are drawbacks associated with this method of operation. For example, the accuracy with which an arm can be positioned may be degraded as the mechanism's parts become worn. Positional accuracy requirements may also limit the speed with which the robotic arm can be manipulated, and require that a target object be precisely positioned prior to its being manipulated.

SUMMARY OF THE INVENTION

A robotic arm and control system are presented which overcome the problems noted above, providing efficient and accurate effector positioning and movement under a variety of operating conditions.

A robotic arm in accordance with the present invention moves in response to one or more command signals. One or more fiducials are located on the arm. Each fiducial is an "active" fiducial, meaning that each emits its own light. A 3D sensing device having an associated field-of-view (FOV) is positioned such that at least one of the fiducials and a target object to be manipulated with the arm are in the FOV. To determine their spatial positions, the arm fiducials are activated and the target object is preferably illuminated with a scanning laser, thereby enabling the sensing device to produce output signals which vary with the spatial locations of the fiducials and target object.

The system also includes a controller which receives the output signals from the sensing device. The controller uses the spatial position information provided by the sensing device as feedback to continuously guide the arm towards the target object. Providing a closed loop 3D motion control system in this way enables the arm to be made of non-precision construction, having few, if any, position and/or angle sensors.

Multiple active fiducials may be employed, each having respective characteristics with which they can be differentiated. Active fiducials might also be deployed on the target objects, or on a holding fixture in which target objects are placed. Variations involving multiple robotic arms and/or multiple 3D sensing devices are also described.

These and other features, aspects, and advantages of the present invention will become better understood with reference to the following drawings, description, and claims.

DETAILED DESCRIPTION OF THE INVENTION

Figure 1:
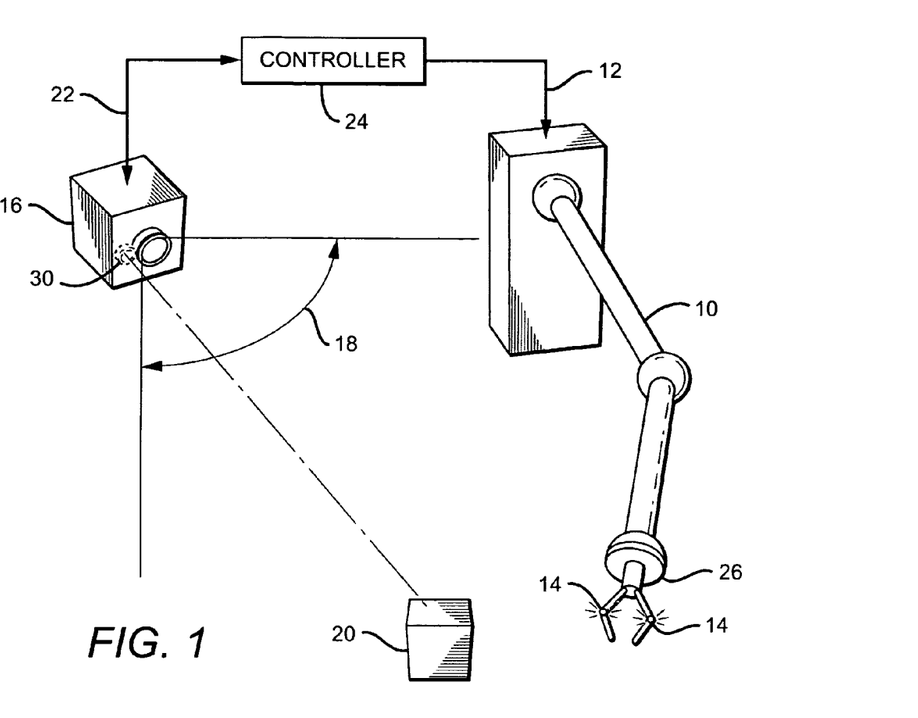
FIG. 1 is a diagram illustrating the basic configuration of a robotic arm and control system per the present invention.

The basic configuration of a robotic arm and control system in accordance with the present invention is shown in FIG. 1. The system includes a robotic arm 10 which moves in response to one or more command signals 12. There is at least one "active" fiducial 14 located on robotic arm 10. As used herein, an "active" fiducial is one that emits its own light—i.e., it is self-illuminating.

The system also includes a 3D sensing device 16 having an associated field-of-view (FOV) 18, positioned such that at least one of the fiducials 14 on arm 10, and a target object 20 to be manipulated with the arm, are in the sensing device's FOV. 3D sensing device 16 is preferably a 3D camera, though other types of devices, such as [??], could also be used. However, for simplicity, sensing device 16 is referred to as a 3D camera hereinafter.

The fiducials are preferably controllable—i.e., they can be activated and deactivated on demand. To determine the spatial positions of the arm and target object, the arm fiducials are activated and the target object is preferably illuminated with a scanning laser, so that each can be detected by 3D camera 16. 3D camera 16 is arranged to produce output signals 22 with which target object 20 and the spatial locations of the fiducials in FOV 18 can be determined.

A controller 24 receives output signals 22 from 3D camera 16, and provides command signals 12 to robotic arm 10. Controller 24 is arranged to provide closed loop control of arm 10: the controller uses the spatial position data provided by 3D camera 16 as feedback to continuously guide the arm towards target object 20. Providing a closed loop 3D motion control system in this way enables arm 10 to be made of non-precision construction, having few, if any, position and/or angle sensors.

Robotic arm 10 would typically include an effector 26, such as a gripper, with which target object 20 is manipulated. To ensure that the spatial location of the gripper can be determined by the system, at least one of the active fiducials is located on or a known distance from the effector.

As noted above, each active fiducial emits its own light, which is preferably controllable so that the light can be commanded ON or OFF. When multiple active fiducials are employed within the FOV of the 3D camera, the fiducials have respective characteristics with which they can be differentiated. For example, different fiducials can emit light having different wavelengths (preferably within the visible spectrum), a given fiducial could emit light which includes at least two different wavelengths, a fiducial could be arranged such that the wavelength of its emitted light changes in a predetermined pattern, or the emitted light could be modulated in a predetermined pattern. Another possible way to distinguish between fiducials is to have the fiducials form respective predetermined patterns, such as a cross, a bar, or an equivalent feature. These differentiation techniques allow one or more 3D cameras to operate and control one or more robotic arms in simultaneous operation. They also increase the 3D camera's detection capability when the background or environment contains other light sources that might interfere with the identification process.

The system preferably employs multiple active fiducials on each robotic arm. This allows the 3D camera to lose sight of one or more fiducials, but still have at least one fiducial visible with which spatial position information can be determined.

As noted above, each active fiducial emits its own light. This can be achieved by using light-emitting diodes, incandescent lamps, and/or optical fibers, for example, or any other compact light sources that may be mounted on the robotic arm or effector.

It may be possible for 3D camera 16 to detect target object 20 and determine its spatial location as long as the object is within the FOV of device 16. However, the system preferably includes a means 30 of illuminating target object 20, to improve the ability of 3D camera 16 to determine the spatial location of the target object.

One possible illumination means 30 is a scanning laser, which uses a laser to scan the target object and thereby enable 3D camera 16 to detect the target object and ascertain its spatial location. Such a laser would preferably be incorporated into 3D camera 16. The laser illuminates target object 20 with a scanning spot or line. 3D camera 16, which preferably comprises dual 2D cameras separated by a known distance, triangulates on the laser spot or line to generate a 3D image of the target object. Thus, by illuminating target object 20 and activating one or more fiducials on arm 10, 3D camera 16 determines the spatial locations of both target object 20 and effector 26, from which the target object's location in space relative to robotic arm 10 can be determined. Use of a scanning laser could also enable the illuminated target object to be identified and measured.

Figure 2:
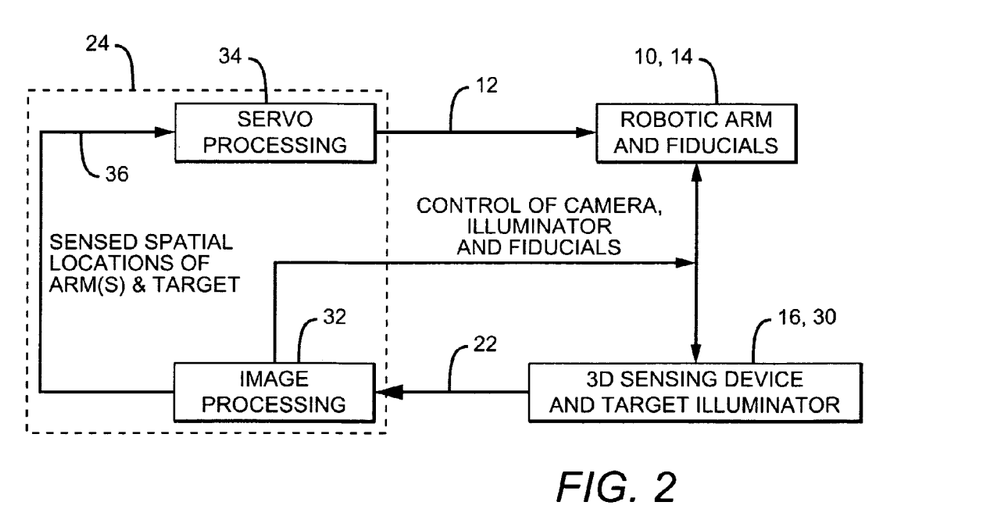
FIG. 2 is a block diagram illustrating one possible embodiment of a control loop as might be used with a robotic arm and control system per the present invention.

A diagram illustrating the closed loop operation of the present system is shown in FIG. 2. In this exemplary embodiment, controller 24 comprises image processing circuitry 32 and servo processing circuitry 34. The functionalities provided by controller 24 are preferably implemented digitally, using a software-driven processor, but might also be implemented with analog circuitry. Image processing circuitry 32 receives signals 22 from 3D camera 16, and produces outputs 36 which vary with the spatial positions of fiducials 14 and target object 20. Image processing circuitry 30 is also arranged to control the operation of 3D camera 16, fiducials 14 and target illuminator 30.

Servo processing circuitry 34 receives spatial position signals 36, and provides command signals 12 to robotic arm 10 such that fiducials 14 are moved towards target object 20; in this way, command signals 12 serve as feedback to continuously guide arm 10 towards target object 20, thereby providing closed loop 3D motion control.

One possible sequence of operations for a system which includes a 3D camera and laser scanner proceeds as follows:

1. Controller 24 prepares to move robotic arm 10 and its effector 26 to a spatial location to be determined.
2. Controller 24 enables scanning laser 30 to locate and illuminate one or more target objects 20, which is imaged by 3D camera 16. When done, the controller disables the scanning laser and commands 3D camera 16 to operate in a fiducial detection mode.
3. Controller 24 activates one or more of the active fiducials on robotic arm 10. This may include initiating the characteristic behaviors which differentiate the fiducials as discussed above.
4. 3D camera 16 detects the active fiducial(s). The camera may perform a subtractive action by capturing "scene" data when the fiducials are off and then again when they are on, so as to remove the effects of background or other interfering items or sources in the field of view.
5. The 3D camera (or computations performed in controller 24) computes the spatial locations of the active fiducials and target object.
6. Controller 24 computes the difference between the spatial location of target object 20 and the spatial location of end effector 26. Using this information, controller 24 produces command signals 12 which cause arm 10 to be guided towards target object 20.
7. Steps 3 through 6 are executed until end effector 26 reaches the desired location.

Figure 3:
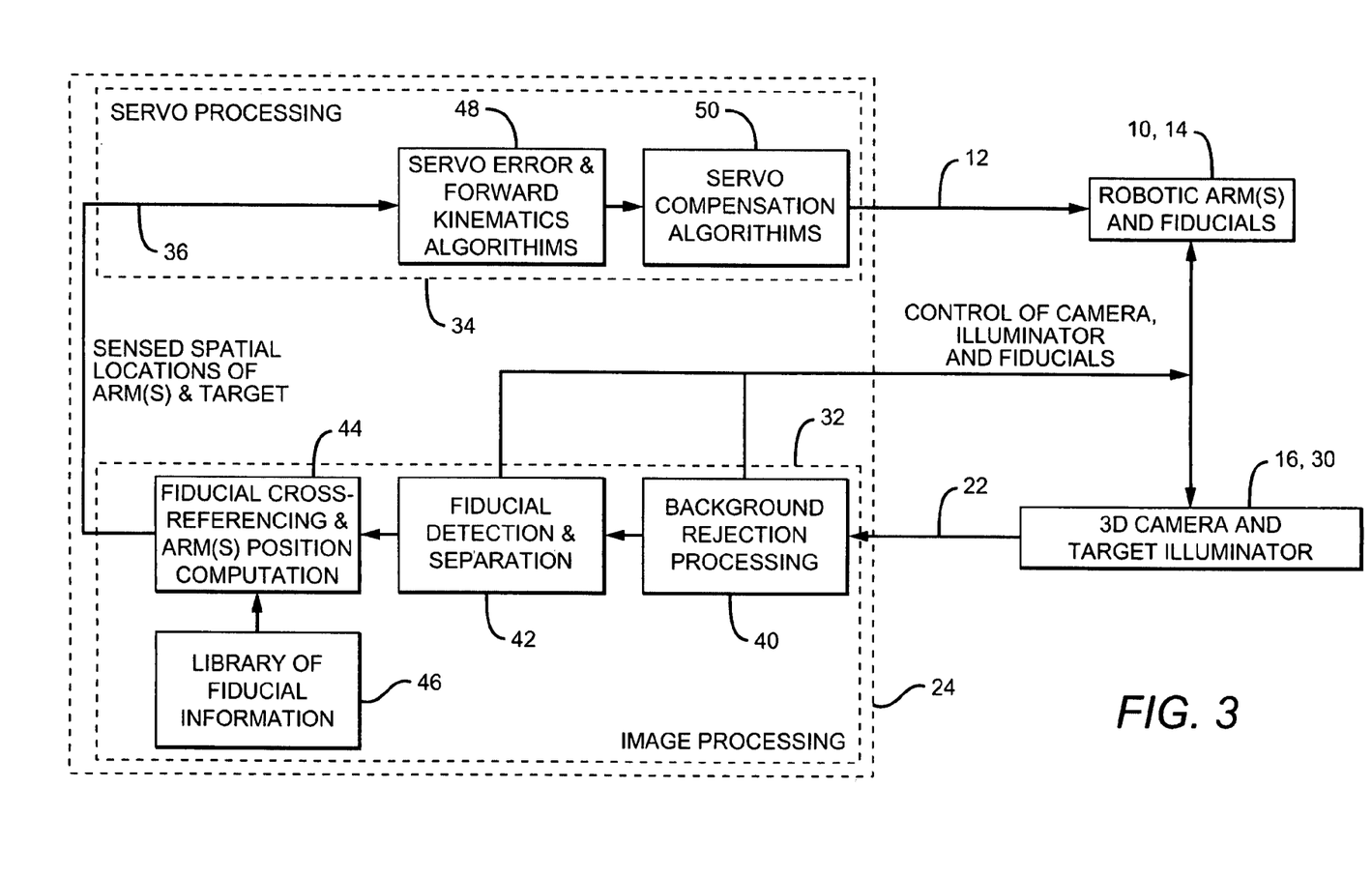
FIG. 3 is a block diagram illustrating additional details of a control loop such as that shown in FIG. 2.

A diagram illustrating additional details of image processing circuitry 32 and servo processing circuitry 34 is shown in FIG. 3. The location of target object 20 is preferably ascertained first, using a scanning laser as described above. The spatial positions of the active fiducials are determined next. Image processing circuitry 32 preferably includes a background rejection processing module 40, which is arranged to perform the subtractive action described above in step 4. Here, 3D camera 16 captures the scene in its FOV when the active fiducials are not illuminated, and again when they are illuminated. Background rejection processing module 40 subtracts the non-illuminated image from the illuminated image, and outputs the result.

A fiducial detection and separation module 42 receives the image produced by background rejection processing module 40. Assuming there are multiple fiducials in the FOV, and each has characteristics which enable it to be differentiated from the others, fiducial detection and separation module 42 detects the presence of each fiducial and notes its characteristics.

The characteristics of the respective fiducials are passed on to a fiducial cross-referencing and arm position computation module 44, which has access to a library 46 that includes of information on each fiducial and its corresponding characteristics. By identifying and knowing the spatial position of each fiducial, and combining this data with knowledge of where each fiducial is physically located on robotic arm 10, module 44 can compute the spatial location of the arm.

As noted above, image processing circuitry 32 is also arranged to activate the scanning laser and determine the spatial location of target object 20. Data 36 representing the spatial locations of arm 10 and target object 20 is provided to servo processing circuitry 34.

Servo processing circuitry 34 accepts the spatial position data and, based upon the sensed position of the arm, determines the required command signals 12 to output to the robotic arm drive system. In a preferred implementation, the position data is operated on by servo error and forward kinematics algorithms 48, followed by one or more servo compensation algorithms 50 which allow the arm to perform efficient, smooth motion based upon the characteristics of the arm. As robotic arm 10 moves, 3D camera 16 captures the positions of the various fiducials, with image processing circuitry 32 controlling each of the active fiducials and the 3D camera.

Note that the implementations of controller 24 described above are merely exemplary. It is only essential that controller 24 be arranged to receive spatial position data from a device such as a 3D camera, and to provide closed loop 3D motion control of a robotic arm in response.

As noted above, 3D camera 16 preferably comprises dual 2D cameras. The cameras are separated by a known distance, and, when a scanning laser is employed, triangulate on the spot or line created by the scanning laser to generate a 3D image of the target object. The 2D cameras are suitably CCD-type cameras. A laser and galvanometer are added to form a laser scanning 3D camera.

In many applications, it is not practical to place active fiducials on the target objects. The present system avoids the need for such fiducials by illuminating the target objects with a scanning laser or similar device, and then determining the position of the illuminated object with the 3D camera.

Figure 4:
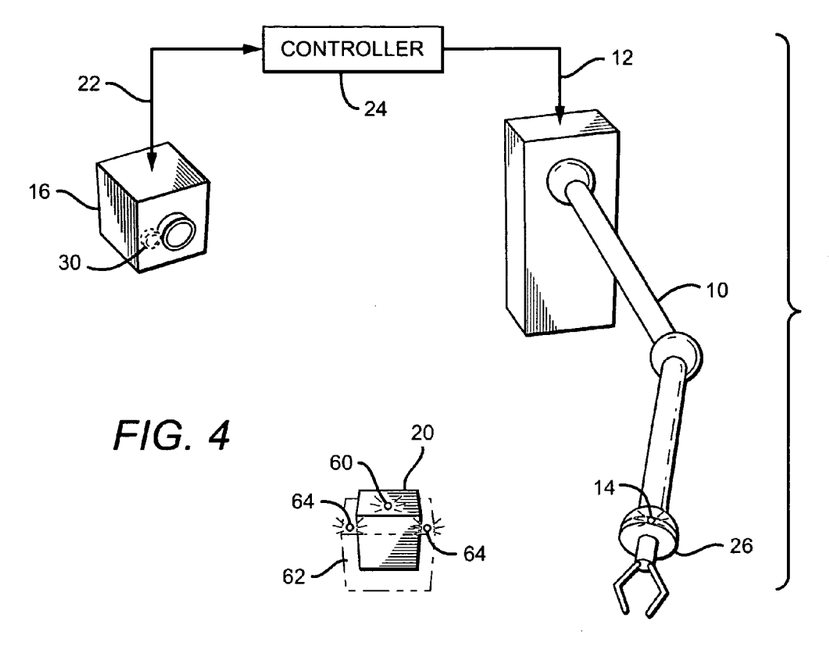
FIG. 4 is a diagram illustrating a configuration of a robotic arm and control system per the present invention which includes a target object holding fixture.

However, as an alternative to a scanning laser, active fiducials might also be located on the target object. This is illustrated in FIG. 4. Here, one or more active fiducials are positioned on target object 20. When so arranged, 3D camera 16 can determine the spatial location of target object 20 in the same way that it determines the spatial location of robotic arm 10—by imaging the object while its fiducials are activated—thereby eliminating the need for a scanning laser.

In some applications, a holding fixture such as a test tube holder or holding bin is employed to hold a target object while it is being manipulated by robotic arm 10. This possibility is also illustrated in FIG. 4. Here, target object 20 is placed within a holding fixture 62. In this case, one or more active fiducials 64 are preferably located on the fixture, so that its spatial location may be determined with 3D camera 16. If it is necessary to pinpoint the location of the target object itself, one or more active fiducials could also be located on the target object, or scanning laser 30 could be used for this purpose.

Figure 5:
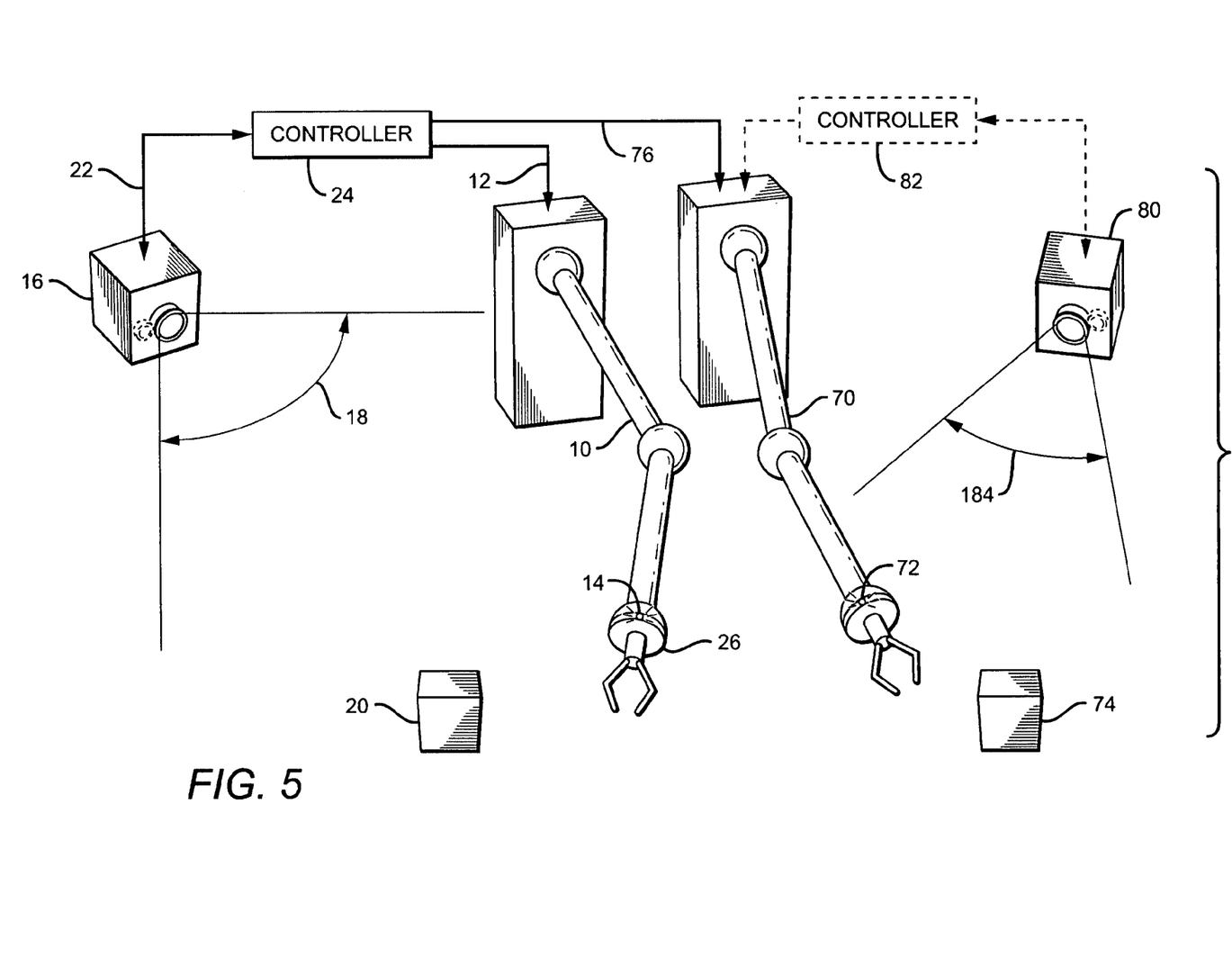
FIG. 5 is a diagram illustrating a configuration of a robotic arm and control system per the present invention which includes two robotic arms.

A system in accordance with the present invention could be implemented using any of a number of different configurations. For example, as shown in FIG. 5, 3D camera 16 could be used to control robotic arm 10, and a second arm 70. In this arrangement, arm 70 includes one or more active fiducials 72 which can be differentiated from those used on arm 10. Both fiducials 72 and the target object 74 to be manipulated by arm 70 must be within the FOV of 3D camera 16, or the system must be arranged such that the position of 3D camera 16 can be moved as needed to accommodate both arms. Controller 24 is arranged to process the spatial position information for both arms, and provides command signals 12 and 76 to arms 10 and 70, respectively, to control their movements.

Another possible configuration is also shown in FIG. 5; here, robotic arm 70 is controlled with the use of a second 3D camera 80 and a second controller 82. In this arrangement, fiducials 72 and target object 74 are within the FOV 84 of camera 80.

Figure 6:
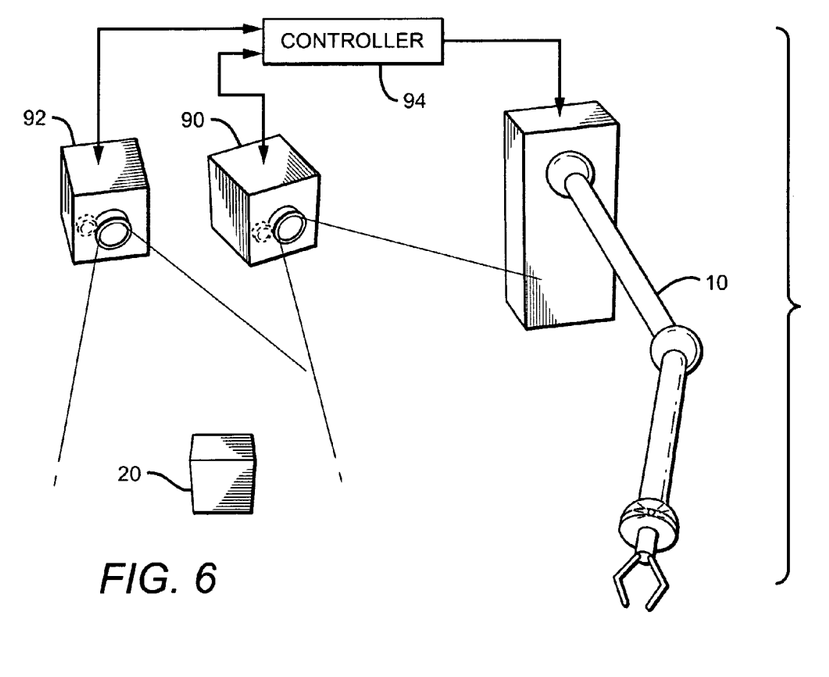
FIG. 6 is a diagram illustrating a configuration of a robotic arm and control system per the present invention which includes a first camera dedicated to imaging the system's robotic arm and a second camera dedicated to imaging a target object.

Another possible configuration is illustrated in FIG. 6. Here, one 3D camera 90 is dedicated to imaging the active fiducials on robotic arm 10, and a second 3D camera 92 is dedicated to imaging target object 20. Target object 20 can be sensed by any of the methods described above, including the use of a scanning laser or the use of an active fiducial on the object or its holding fixture. The imaging data from both cameras is fed to one or more controllers 94, which processes the data to determine the spatial positions of arm 10 and target object 20, which is used as feedback to continuously guide the arm towards target object 20. Dedicated camera 90 might also be used to image active fiducials on other robotic arms, and dedicated camera 92 might also be used to image other target objects.

The embodiments of the invention described herein are exemplary and numerous modifications, variations and rearrangements can be readily envisioned to achieve substantially equivalent results, all of which are intended to be embraced within the spirit and scope of the invention as defined in the appended claims.

I claim:

1. A robotic arm and control system, comprising:
   a robotic arm which moves in response to one or more command signals;
   one or more independently controllable fiducials located on said arm, each of said fiducials being an "active" self-illuminating fiducial such that each emits its own light when activated;
   a 3D sensing device having an associated field-of-view (FOV), positioned such that at least one of said active fiducials and a target object to be manipulated with said arm are in said sensing device's FOV, said sensing device arranged to produce output signals with which the spatial locations of said at least one of said active fiducials and said target object can be determined; and
   a controller arranged to control the activation of said independently controllable active fiducials, said controller further arranged to receive said output signals from said sensing device, to activate one or more of said active fiducials, and to provide said one or more command signals to said robotic arm, said controller arranged to provide closed loop control of said arm such that said at least one of said active fiducials is moved towards said object.

2. The system of claim 1, wherein said robotic arm includes an effector with which said target object is manipulated, at least one of said active fiducials located on or a known distance from said effector.

3. The system of claim 1, wherein said active fiducials have respective characteristics with which they can be differentiated.

4. The system of claim 1, wherein one or more of said active fiducials emit light which includes at least two different wavelengths.

5. The system of claim 1, wherein one or more of said active fiducials are arranged such that the wavelength of their emitted light changes in a predetermined pattern.

6. The system of claim 1, wherein one or more of said active fiducials emit light that is modulated in a predetermined pattern.

7. The system of claim 1, wherein one or more of said active fiducials are arranged to form a predetermined pattern.

8. The system of claim 1, wherein one or more of said active fiducials comprise light-emitting diodes, incandescent lamps, and/or optical fibers.

9. The system of claim 1, further comprising a means of illuminating said target object.

10. The system of claim 9, wherein said means of illuminating said target object comprises a scanning laser.

11. The system of claim 1, wherein said 3D sensing device is a 3D camera, said controller arranged to:
    capture the image in said camera's FOV when said active fiducials are not illuminated;

capture the image in said camera's FOV when said active fiducials are illuminated; and subtract the non-illuminated image from the illuminated image and use the resulting image to determine the spatial locations of said fiducials.

12. The system of claim 1, wherein said controller comprises:

an image processing module arranged to:
- receive said 3D sensing device's output signals;
- determine the spatial location of said at least one of said fiducials on said robotic arm; and
- determine the spatial location of said target object; and a servo processing module arranged to:
- receive spatial location data for said at least one of said fiducials and said target object from said image processing circuit; and
- provide said one or more command signals to said robotic arm such that said controller provides closed loop control of said arm such that said at least one of said fiducials is moved towards said target object.

13. The system of claim 12, wherein said image processing circuit is further arranged to control the operation of said at least one of said fiducials and/or the positioning of said 3D sensing device.

14. The system of claim 12, wherein said active fiducials comprise at least two fiducials, each of which is in said sensing device's FOV and emits light having associated characteristics which enables said fiducials to be differentiated, said image processing circuit further arranged to detect and determine the spatial positions of said at least two fiducials.

15. The system of claim 1, further comprising one or more active fiducials located on said target object, said 3D sensing device positioned such that at least one of said fiducials located on said target object is in said sensing device's FOV, said sensing device arranged to produce output signals with which the spatial locations of said at least one of said fiducials located on said target object can be determined.

16. The system of claim 1, wherein said target object is held in a fixture, further comprising one or more active fiducials located on said fixture, said 3D sensing device positioned such that at least one of said fiducials located on said fixture is in said sensing device's FOV, said sensing device arranged to produce output signals with which the spatial locations of said at least one of said fiducials located on said fixture can be determined.

17. The system of claim 1, further comprising at least one additional robotic arm, each of said additional arms moving in response to one or more command signals and having one or more active fiducials located on said arm.

18. The system of claim 17, wherein said 3D sensing device is positioned such that at least one of said fiducials on each of said arms is in said sensing device's FOV, said sensing device arranged to produce output signals with which the spatial locations of said at least one of said fiducials on each of said arms can be determined.

19. The system of claim 17, further comprising at least one additional 3D sensing device, each of said sensing devices positioned such that at least one fiducial on a respective arm and a target object are in said sensing device's field-of-view (FOV).

20. The system of claim 1, wherein said 3D sensing device is a 3D camera.

21. The system of claim 1, wherein said controller is arranged such that said active fiducials can be selectively turned on and off either one at a time or in groups.

22. The system of claim 1, said system arranged such that the spatial location of said target object is determined without reference to any special markings or distinctive targets on said target object.

23. A robotic arm and control system, comprising:

a robotic arm which moves in response to one or more command signals;

one or more independently controllable fiducials located on said arm, each of said fiducials being an "active" self-illuminating fiducial such that each emits its own light when activated;

a first 3D sensing device having an associated field-of-view (FOV), positioned such that at least one of said active fiducials is in said first sensing device's FOV, said first sensing device arranged to produce output signals with which the spatial location of said at least one of said active fiducials can be determined;

a second 3D sensing device having an associated FOV, positioned such that at least one target object to be manipulated with said arm is in said second sensing device's FOV, said second sensing device arranged to produce output signals with which the spatial location of said target object can be determined; and a controller arranged to control the activation of said independently controllable active fiducials, said controller further arranged to receive said output signals from said sensing devices, to activate one or more of said active fiducials, and to provide said one or more command signals to said robotic arm, said controller arranged to provide closed loop control of said arm such that said at least one of said active fiducials is moved towards said target object.

24. A robotic arm and control system, comprising:

a robotic arm which moves in response to one or more command signals;

one or more independently controllable fiducials located on said arm, each of said fiducials being an "active" self-illuminating fiducial such that each emits its own light when activated;

an effector coupled to said arm with which a target object is manipulated, at least one of said active fiducials located on or a known distance from said effector;

a means of illuminating said target object;

a 3D camera positioned such that at least one of said active fiducials and said target object are in said camera's field-of-view (FOV), said camera arranged to produce output signals with which the spatial locations of said at least one of said active fiducials and said target object can be determined; and a controller arranged to control the activation of said independently controllable active fiducials, said controller further arranged to receive said output signals from said 3D camera, to activate one or more of said active fiducials, and to provide said one or more command signals to said robotic arm, said controller arranged to provide closed loop control of said arm such that said at least one of said active fiducials is moved towards said target object.

25. The system of claim 24, wherein said means of illuminating said target object comprises a scanning laser.

26. A method of controlling a robotic arm, comprising:

activating at least one independently controllable fiducial located on a robotic arm, each of said fiducials being a self-illuminating "active" fiducial such that each emits its own light when activated;

determining by a processor the spatial location in three dimensions of at least one fiducial;

determining by the processor the spatial location in three dimensions of a target object;

continuously comparing the spatial locations of said at least one active fiducial and said target object; and moving said arm based on said continuous comparing so as to reduce the difference between the spatial locations of said at least one active fiducial and said target object, such that said at least one active fiducial is moved towards said target object.

27. The method of claim 26, further comprising illuminating said target object.

* * * * *